(12) United States Patent
Rouse et al.

(10) Patent No.: US 6,426,136 B1
(45) Date of Patent: Jul. 30, 2002

(54) METHOD OF REDUCING MATERIAL SIZE

(75) Inventors: Michael W. Rouse, Vicksburg, MS (US); Victor M. Deeb, Marlborough, MA (US)

(73) Assignee: R & D Technology, Inc., Vicksburg, MS (US)

( * ) Notice: Subject to any disclaimer, the term of this patent is extended or adjusted under 35 U.S.C. 154(b) by 0 days.

(21) Appl. No.: 09/476,355

(22) Filed: Jan. 3, 2000

Related U.S. Application Data
(60) Provisional application No. 60/074,227, filed on Feb. 10, 1998.

(51) Int. Cl.$^7$ .............................. B32B 5/16; B02C 19/00
(52) U.S. Cl. ...................... 428/327; 428/402; 428/489; 428/492; 241/1; 241/2; 241/15; 241/21; 241/24; 241/27
(58) Field of Search ................................ 428/402, 492, 428/489, 327; 241/1, 2, 15, 21, 24, 27

(56) References Cited

U.S. PATENT DOCUMENTS

| | | | |
|---|---|---|---|
| 4,466,923 A | 8/1984 | Friedrich .................. 260/412.4 |
| 4,703,060 A | 10/1987 | Traitler et al. ............... 514/549 |
| 5,034,132 A | 7/1991 | Miyakawa et al. .......... 210/634 |
| 5,120,558 A | 6/1992 | Nguyen et al. .............. 426/425 |
| 5,290,578 A | 3/1994 | Passey et al. ................ 426/417 |
| 5,304,576 A | 4/1994 | Martinez ..................... 521/41 |
| 5,316,591 A | 5/1994 | Chao et al. .................. 134/34 |
| 5,339,844 A | 8/1994 | Stanford, Jr. et al. ........ 134/107 |
| 5,403,089 A | 4/1995 | Kuo et al. ................... 366/132 |
| 5,418,256 A | 5/1995 | Dhawan et al. ............. 521/44.5 |
| 5,435,325 A | 7/1995 | Clapp et al. ................. 131/297 |
| 5,456,759 A | 10/1995 | Stanford, Jr. et al. ............ 134/1 |
| 5,467,492 A | 11/1995 | Chao et al. ..................... 8/159 |
| 5,509,959 A | 4/1996 | Nielsen et al. .................... 106/287 |
| 5,639,441 A | * | 6/1997 | Sievers et al. ................ 424/9.3 |
| 5,639,934 A | 6/1997 | Yamasaki et al. ............ 585/820 |
| 5,716,558 A | 2/1998 | Nielsen et al. ................. 264/13 |
| 5,766,522 A | 6/1998 | Daly et al. .................... 264/13 |
| 5,778,282 A | 7/1998 | Nagashima .................. 399/106 |
| 5,789,505 A | * | 8/1998 | Wilkinson et al. ........... 526/209 |
| 5,810,267 A | * | 9/1998 | Karasawa ...................... 241/5 |
| 5,854,311 A | * | 12/1998 | Richart ........................ 523/309 |
| 5,861,473 A | 1/1999 | DeCrosta et al. ............ 528/490 |
| 5,874,029 A | * | 2/1999 | Subramaniam et al. ........ 264/12 |
| 5,921,478 A | 7/1999 | Kamiwano et al. ............. 241/5 |
| 5,975,874 A | 11/1999 | Daly et al. ................... 425/204 |
| 5,981,474 A | 11/1999 | Manning et al. ................ 514/2 |
| 5,981,696 A | 11/1999 | Saatweber et al. ........... 528/501 |
| 6,051,694 A | * | 4/2000 | Castor et al. ................ 530/418 |

OTHER PUBLICATIONS

Haukka, "Supercritical CO2 Separation Process For Environmental Needs", Aug. 28, 1999, pp. 1–2.

Gehrig, "Extraction of foodstuff with Carbon Dioxide: Present status and potential", NATECO, pp. 1–4, Dec. 9, 1999.

Moyong, "Use of hildebrand's Solubility Parameter in Oilseed Lipid Extraction", Dec. 8, 1998, p. 1.

Moses et al., Effects of Supercritical Carbon Dioxide on Polymers–II. Adhesives, Solubility Parameter, and Surface Studies, Dec. 4, 1995, p. 1.

Los Alamos National Laboratory, "The Supercritical Fluids Experimental Laboratory", Oct. 25, 1999 pp. 1–3.

Barton, "Solubility Parameters on the Internet", 1997, pp. 1–7.

Burke, "Part 2—The Hildebrand Solubility Parameter", Aug. 1984, pp. 1–5.

* cited by examiner

*Primary Examiner*—Hoa T. Le
(74) *Attorney, Agent, or Firm*—Heller Ehrman White and McAuliffe

(57) ABSTRACT

The present invention relates to a method of reducing particle size by the use of a supercritical fluid, generally carbon dioxide. The material is swollen by the supercritical carbon dioxide at a high pressure. After the material has been allowed to swell under a high pressure, the pressure is rapidly dropped. When the external pressure is rapidly dropped, the material explodes as the supercritical gas absorbed into the material rapidly expands outward.

17 Claims, No Drawings

METHOD OF REDUCING MATERIAL SIZE

CROSS-REFERENCE TO RELATED APPLICATIONS

The following U.S. Patents are cross-referenced and incorporated by reference herein including the title, abstract, specification, drawings, claims, and figures: U.S. Pat. No. 5,238,194 issued Aug. 24, 1993 to Rouse et al. for "METHOD OF PRODUCING FINE ELASTOMERIC PARTICLES", U.S. Pat. No. 5,411,215 issued May 2, 1995 to Rouse for "TWO STAGE GRINDING," provisional filing Ser. No. 60/074,227 filed Feb. 10, 1998 titled "ASPHALT COMPOSITION WITH POLYMERIC MODIFIER", and Ser. No. 09/247,569 filed Feb. 10, 1999 titled "GROUND ELASTOMER AND METHOD."

BACKGROUND OF THE INVENTION

1. Field of the Invention

The present invention relates to the use of supercritical gases for material size reduction and separation. More specifically, this invention relates to swelling a material particle with a supercritical gas and then rapidly dropping the pressure so that rapid internal expansion of the super critical gas inside the material particle cause the material to be torn apart and further reduced in particle size.

2. Description of the Related Art

In the area of reducing the size of materials from coarse pieces to fine powder, it is generally known to decrease the size of such materials to small particles. For example in the rubber recycling and reusing industry, it is generally known to reduce rubber chips, such as those obtained from the shredding of tires, to particles of irregular outline that pass through a minus 80-mesh or a minus 50-mesh or finer. Wood chips are reduced to a smaller particle size before ligand is extracted. By increasing the surface area of any given material, smaller particle sizes facilitate chemical reactivity and the ease at which a material will dissolve into various mixes.

A variety of techniques for reducing the particle size of materials from coarse materials to fine materials have been developed in the flour, paper pulp industry, paint pigment compounding industries and rubber recycling industries. For example, a variety of rubber products (e.g., natural rubber, synthetic rubber, vulcanized rubber, automotive tire scrap, etc.) may be reduced to coarse materials. Coarse materials are produced from a variety of methods including cutting, shredding, chopping, chipping, milling and grinding. Other known methods include the milling of a material between horizontal grinding stones in a horizontal grinding mill. Such milling techniques include grinding the material between opposed milling wheels, such that one wheel is fixed and the other wheel rotates relative to the fixed wheel. Such known milling techniques include pressing the two wheels against a material slurry, such that the rubber is ground to a fine state (i.e., powder) in a single pass. However, such known milling methods have the disadvantage of creating friction and introducing energy to the slurry, which may increase the temperature of the slurry. Increased slurry temperatures may cause "flash over" in which the slurry becomes a largely dry material mass that inhibits grinding. Such known milling methods further have the disadvantage of not producing a uniformly fine material powder that passes through a minus 50-mesh. Such techniques also require large amounts of water, which requires large amounts of energy to evaporate or centrifuging. Addition methods for producing particles of a decreased size include cryogenic cracking of the material and the use of bead or mead mills. Moreover, smaller particle sizes are desirable, such as particles in the micron or submicron sizes.

Accordingly, it would be advantageous to have a method for converting a coarse material to a finely ground particle. It would also be advantageous to have a method for converting a coarse material to a finely ground particle without centrifuging or using large quantities or any quantity of water. It would also be advantageous to have a method to material to a decreased size that decreases soak time of the material. It would also be advantageous to have a method to convert a material to a decreased size that decreases grinding time of the material. It would also be advantageous to have a method that converts material to a decreased size carried out at a relatively low temperature of material slurry. It would also be advantageous to have a material that chemically combines with an additive that modifies the physical properties of the material.

SUMMARY OF THE INVENTION

In accordance with the present invention is provided a method for converting a material to a decreased size using supercritical carbon dioxide. The method includes optionally preparing said material to make said material capable of being dispersed with super critical liquid carbon dioxide. Such optional preparation involves reducing the material to a coarse particle size by shredding, chopping, chipping, milling or grinding.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF THE PREFERRED EMBODIMENTS

The size of a material may reduced be using a gas that is in a supercritical liquid state. According to one embodiment, the gas is supercritical carbon dioxide. The coarse material for size reduction may be any material that has been previously chopped, shredded, chipped, cut or pulverized, milled, ground etc. In one embodiment the material is between 2 to 200 mesh. In another embodiment the material is 60 to 150 mesh. In another embodiment the material is –40 to 2 mesh.

In a exemplary embodiment, the material may contain rubber. Examples of rubber include natural rubber, synthetic rubber, recycled rubbers containing polyethylene and/or polypropylene, vulcanized rubber, carbon black, waste from tire production, various polymers, various plastics, thermoplastic elastomers, thermoplastic vulcanates, polyethylene plastics, etc.

Other materials may include wood chips, wood pulp or sawdust. It is desirable to extract lignin from such coarse wood materials to facilitate a paper making process that is better for the environment. Additional materials suitable for processing include elastomers, plastomers, agricultural materials, biological materials and forest materials, etc.

Coarse materials are introduced into a pressurizing vessel capable of pressurizing a gas at a temperature above freezing into a supercritical state. A gas is introduced into the vessel and the pressure of the vessel is increased so that the gas liquifies under supercritical conditions. It is preferable to use a gas that vaporizes at ambient temperature. Examples of such gases include carbon dioxide. Carbon dioxide is a preferred gas because carbon dioxide is relatively unreactive, non-toxic, and can liquify at relatively moderate temperatures.

The vessel into which the material for size reduction and the carbon dioxide is introduced is made to operate at the high pressures necessary to bring about a supercritical state in a gas that easily vaporizes at ambient temperatures. When carbon dioxide is in its supercritical state, it will have a solvating effect on the coarse material. For example, tire chips can be exposed to supercritical carbon dioxide in the vessel.

In one embodiment most impurities from the coarse material introduced into the vessel for mixing the supercritical carbon dioxide have been previously removed. For example, if the material is recycled tire chips, the chips may have been previously delaminated and the materials such as metals, cords, and reinforcing materials might have been previously removed. In another embodiment, supercritical carbon dioxide could be used to help separate impurities from the coarse material. For example, super critical carbon dioxide may be used in delaminating the tire chips as well as removing impurities (e.g., metals, cords, reinforcing materials, etc.) from the coarse material. A magnet may be used to remove certain metallic impurities from the coarsely ground material at any time during the processing of the material. For example, the impurities can be removed by passing the ground material through a screen that allows ¼-inch to ⅝-inch particles to pass through.

Soaking the coarse material in supercritical carbon dioxide, among other advantages, causes the material to swell, and can remove impurities from the material such as oils and dissolve adhesives in the material. Research by the Batel labs has recently demonstrated that the solubility parameter of carbon dioxide is between 7.3 and 8.9. Two excellent references for solubility parameters are Allan Barton's *Handbook of solubility Parameters and Other Cohesion Parameters* CRC Press, 1991, and *Handbook of Polymer-Liquid-Interaction Parameters* CRC Press, 1990, also by Allan Barton. It is known that the solubility parameter of hexane is 7.3 and toluene is 8.9. Hexane can swell tire rubber but has a more difficult time swelling vulcanized rubber. Toluene is better at swelling tire rubber due to its aromaticity. Therefore, because super critical carbon dioxide has a solubility parameter of between 7.3 and 8.9, super critical carbon dioxide will readily swell rubber. Super critical carbon dioxide is also advantageous because the small size of the carbon dioxide molecule allows it to better and more deeply penetrate the rubber. In one aspect of the present invention, the solubility parameter of a supercritical gas is advantageously used to soak a material that has similar solubility parameter, or a material having at least a monomer of similar solubility parameter to that of the super critical gas.

Once the material has been swelled, the high pressure of the vessel containing the supercritical carbon dioxide is rapidly dropped so that a great pressure difference is created between the particles and the vessel. Before the pressure is dropped, the particles have been swollen with the supercritical carbon dioxide at high pressure. The supercritical dioxide that is absorbed into particles creates a high internal pressure within the particles. When the pressure external to the particles is rapidly dropped, the particles rapidly expand outwards, causing the particles to rip apart and explode. Many of the resulting particles are in the micron or submicron size. Smaller particles in the micron or submicron size are desirable because they are at they size in which they are able to form colloids. Smaller particles are also better for filling and reinforcing. This process is also advantageous because the smaller rubber particles can be made with less oxidation and degradation.

When smaller particles are fed into the supercritical vessel, they may made fed in a continuous mode. Smaller particles that may be fed by a continuous mode are around 80 mesh or 180 microns in size. Such smaller particles may advantageously have a shorter swelling time in the supercritical reaction vessel than larger particles. Coarser particles around 10 mesh or 2 millimeters will preferably be fed into the supercritical reaction vessel in a batch mode, with the use of valves or rotary airlocks. Such particles will have a longer swelling time. The preferred temperatures and pressures for making a supercritical gas, such as carbon dioxide, into a supercritical liquid are well known to those of ordinary skill in the art. For example, at an ambient temperature, the carbon dioxide can be forced into a supercritical state at a pressure of around 700–5000 psi. In one example, carbon dioxide is forced into a supercritical state when the temperature is about 88 degrees Fahrenheit and the pressure is 1071 psi. Other such examples of combinations of ambient temperatures and pressures high enough to produce supercritical carbon dioxide are well known to those of ordinary skill in the art.

The supercritical carbon dioxide may be used with a variety of additives, as known as coagents. These additives may be polar or nonpolar, organic or aqueous, and may also include surfactants. Additives may assist in the swelling of the rubber and help fractionalize the particles by reducing the cohesiveness of the particles.

According to an exemplary embodiment, a variety of water-soluble additives may be added to the supercritical carbon dioxide or upstream to the feedstock material. The additive, when used during soaking of the material, serves to decrease the swelling time of the material as compared to material soaked in the absence of the additive. According to an alternative embodiment, the additive may be a chemical that swells the rubber, but is not a tackifier, such as tetrahydrofuran (THF) or dimethyl formamide (DMF). According to other alternative embodiments, a variety of additives (as described below) may be used when soaking the material. According to one embodiment the additive used when soaking the material is a fatty amine, such as DELAMIN™ commercially available from Hercules, Inc.

The size of the soaked material may be decreased in a grinding apparatus, such as a set of milling stones. According to an alternative embodiment, the size of the soaked material may be decreased by freezing the material and cracking or hammering the material into small sized particles. According to other alternative embodiments, the soaked material is shredded by a series of blades or an Archimedes screw apparatus. According to still other alternative embodiments, the size of a soaked or non-soaked material may be decreased by brute force (i.e., by two counteracting surfaces). According to an embodiment, grinding of the soaked material material is achieved using the grinding apparatus as disclosed in U.S. Pat. No. 5,238,194 issued Aug. 24, 1993 to Rouse et al. for "METHOD OF PRODUCING FINE ELASTOMERIC PARTICLES" and incorporated herein by reference. The grinding apparatus expediently includes a horizontal grinding machine providing a fixed stator and a rotating rotor, on which disc-shaped grinding stones having hollow centers can be mounted. The grinding stones provide flat, opposing abrasive surfaces (i.e., flat annulus surface), and each grinding stone is opposed to the other. The abrasive surfaces provide periodically spaced openings in the annulus for introducing the materials to be ground between the closed, cooperating abrading surfaces.

An material slurry may be formed by adding a carrier to the ground material. According to an alternative embodiment, the carrier may be a gas (e.g., air) that may carry a wet or dry stream of material particles. According to other alternative embodiments, the carrier is a fluid (e.g., water). According to other alternative embodiments, the carrier may be provided through the grinding apparatus before the slurry is provided through the grinding apparatus. According to any embodiment, a uniform set point fluid flow rate through a properly spaced set of grinding stones is determined as disclosed in U.S. Pat. No. 5,238,194 issued Aug. 24, 1993 to Rouse et al. for "METHOD OF PRODUCING FINE ELASTOMERIC PARTICLES" and incorporated herein by reference.

According to an exemplary embodiment of the present invention, the additive may be added to the slurry. The additive provides for faster grinding of the slurry as compared to a slurry in which the additive is absent. According to an alternative embodiment the additive is a water miscible dispersing agent for carbon black, such as DAXAD™ commercially available form R. T. Vanderbilt Company, Incorporated of Norwalk, Conn. According to a particularly preferred embodiment of 25% DAXAD™ is added to an material slurry of 15% to 60% solids. According to an alternative embodiment, the additive is a surfactant, such as TRITON-X™ commercially available from Rohm & Haas Company. According to a particularly preferred embodiment, the additive is added to the slurry in the amount of about 1% to 20% based on the amount of material in the slurry, and about 10% to 15% by total weight of the material in the slurry.

The additive provides a higher yield at the first pass of grinding of the slurry as compared to a slurry in which the additive is absent. Use of the additive produces a higher quantity (i.e., more uniformly fine ground and having less shear) particle as compared to the particles produced from a slurry in which the additive is absent. A slurry having an additive yields a significant increase in throughput of ground particles of the desired smaller size, and a smaller percentage of particles passed through the mill without adequate reduction in size. This alone is beneficial, as the economic losses occasioned by the necessity of screening out insufficiently reduced particles and re-grinding them can be reduced. Further, use of the additive provides decreased grinding times of the slurry as compared to a slurry in which the additive is absent. Decreased grinding times may reduce wear and damage to the wheels of the grinding apparatus.

The additives provide a lower temperature to the slurry as compared to a slurry in which the additive is absent. A slurry in which the additive is absent reaches a temperature of about 400° to 450° Fahrenheit, whereas the slurry having the additive reaches a temperature of about 300° Fahrenheit. Decreased temperature of the slurry is beneficial, in part, because high temperatures may destroy some polymers, less insulation is required in the grinding apparatus, heat damage to the grinding apparatus is decreased and the temperature of the grinding operation is better controlled to achieve the desired viscoelastic effects in milling the material.

The additives chemically react with the material to produce a more desirable material particle. The glass transition temperature (Tg) of the material-additive product is reduced as compared to material particle product in which the additive is absent. A lower Tg value is beneficial in producing downstream materials from the material-additive product because a lower temperature is required for the material-additive product to change from a brittle state to a plastic state, which reduces energy costs. Further, the additives chemically react with the material to produce a more tacky material additive particle product as compared to the material particle product in which the additive is absent.

According to an alternative embodiment, the additive is a resin (natural or synthetic). According to other alternative embodiments, the additive is a rosin (i.e., a mixture of monocarboxylic acids having a hydrophenanthrene nucleus) such as gum rosin or wood rosin. Rosins are of particular interest because they tend to act as dispersing agents in the clastomer slurry and effect the tackiness of the material-additive product. According to a preferred embodiment of the present invention, the rosin is tall oil rosin (i.e., a by-product of the paper manufacturing process). According to a particularly preferred embodiment, the tall oil rosin has a low acid number, such as XP56™ commercially available from Arizona Chemical Company.

According to an alternative embodiment, the additive is a resin acid (i.e., abietic-type acids that contain an isopropyl group pendent from carbon 13 as numbered using the Chemical Abstracts system, or primaric-type acids that include a methyl and vinyl group pendent from the same carbon atom). According to other alternative embodiments, the resin acid is abietic acid or rosin soap (i. e., rosin leached with sodium hydroxide). The rosin is made water-soluble by neutralizing the rosin with a suitable base, such as ammonia, ammonium hydroxide, an amine (i.e., a Frisch amine). Other additives of interest include any rosin acid, polymerized rosin acid, esters of rosin acid, dispersions of rosin acid, dispersions of esters of rosin acid, copolymers of rosin acid, disproportionated rosin acid, hydrogenated rosin acid, 9-anthracene carboxylic acid, 2-ethylhexanoic acid, acetal R-type acids, or any organic acid that could be soluble in water by neutralzing the acid.

According to an alternative embodiment, the additive oleic acid (i.e., $(CH_3(CH_2)_7CH;CH(CH_2)_7COOH$ derived from animal tallow or vegetable oils). Oleic acid may not substantially modify the tackiness of the clastomer-additive product.

According to one embodiment, the additive is an oligimer (i.e., alow molecular weight polymer molecule consisting of only a few monomer units (e.g., dimer, trimer, tetramer)). In another embodiment, the oligimer has a viscosity of about 100,000 CP and tends to act as a dispersing agent in the material slurry. In another embodiment the oligimer is short chain copolymers of styrene and maleic anhydride that offer typical anhydride functionality in a polymeric material such as SMA™ resin commercially available from Sinclair Petrochemicals, Incorporated. According to another embodiment, the oligimer is ethylene-maleic anhydride copolymers such as EMA™ resin commercially available from Monsanto Industrial Chemicals Co. According to an alternative embodiment, the additive is an ester, such as di(2-ethylhexyl) adipate (also known as dioctyl adipate or DOA), DOS, DOD or plasticizers in PVC.

A filler may optionally be added to the upstream slurry or with the supercritical carbon dioxide. The filler may be added to the slurry (i.e., material slurry or material-additive slurry) to combine with the slurry to form an material-additive product or an material product having reinforcing properties, temperature modifying properties, increased high surface area, and/or increased tensile strength. A filler (e.g., nylon) combines with the final material product to give the final product reinforcing properties, temperature modifying properties, increased high surface area, and/or increased tensile strength. According to a particularly preferred embodiment of the present invention, the filler is a nylon material.

The slurry (i.e., material-additive slurry or material slurry) is provided within a grinding apparatus and the material and the additive can be co-ground (or the material is ground) to decrease the material particles to a decreased size. According to one embodiment, the slurry is provided between the two wheels of the grinding apparatus as disclosed in U.S. Pat. No. 5,238,194 issued Aug. 24, 1993 to Rouse et al. for "METHOD OF PRODUCING FINE ELASTOMERIC PARTICLES" and incorporated herein by reference. The grinding stones can be brought into contact with (or spaced a distance apart from) each other. Choosing or maintaining the fixed position of the grinding stones with respect to each other is known in the art of colloid mills. Persons of skill in the art will readily understand how the slurry is input, at a feed pressure, to such grinding stones and how the spacing between the stones is to be adjusted and set. The grinding action generates heat, which may be controlled, modified or reduced by the particular additive in the slurry.

The carrier and the slurry (i.e., material-additive slurry or material slurry) can be separated. according to an alternative embodiment, the liquid from the slurry is removed to a capture region positioned outside the outer perimeter of the opposed grinding stones. according to a preferred embodiment, the carrier is removed by a centrifuge action, such that the carrier is driven off from the slurry and the material-additive particles or the material particles remain.

The grinding of the slurry (i.e., material-additive slurry or material slurry) may be conducted in a single pass or a multiple pass operation. According to an alternative embodiment, the grinding operation may be conducted in a single pass where the coarse particles that do not pass a screening operation can be feed to a slurry (i.e., material-additive slurry or material slurry) for re-grinding. According to any alternative or preferred embodiment, the grinding operation may be conducted in a multiple pass where two interconnected grinding mills sequentially grind the slurry to a final fine grind state as disclosed in U.S. Pat. No. 5,411,215 issued May 2, 1995 to Rouse for "TWO STAGE GRINDING" and incorporated herein by reference. According to the multiple pass grinding operation, a first grinding mill produces an intermediate feedstock of decreased size. The feedstock is re-wet with water or another carrier to form a feed slurry that is then sequentially fed into a second mill. The multiple pass grinding operation, by selecting optimum size of the grinding stones for production of the intermediate feedstock and then for the production of the final minus 80-mesh to 200-mesh product, requires less energy than, for example, the single pass grinding operation.

The material-additive or material product may be dried by heat or air. According to an alternative embodiment, the carrier "flashes off" when the ground particles in slurry exit from between the grinding stones to a decreased pressure (i.e., atmospheric pressure). The flash avoids the necessity of having a separate processing step of drying the ground particles, which saves energy costs of running a separator. The material product is recovered.

The material, which preferably chemically bonds with the additive to form the material-additive product, has certain functional characteristics. According to an exemplary embodiment, the material-additive product is a very fine powder having a consistency similar to cooking flour.

According to an alternative embodiment, the material-additive product is in the original vulcanized state. The top and bottom variation of the softening point of the rosin-modified material-additive product varies by about 1° Celsius This range of softening variation is advantageous compared to the material product that his is not rosin-modified, which has a top and bottom softening point that various by about 10° Celsius By using one or more additives with the ground material as described herein, a finely ground product is obtained that his unexpectedly superior in terms of many of its properties, particularly when used in asphalt products such as roofing, paving, building materials, sealants, etc. The final product obtained when using one or more additives as described herein will generally have a bulk density of 26–28 lbs./sq. ft., have a specific gravity of from 1.13+\−0.02, have 100% of the particles finer than 176 microns or minus 80 mesh. Ground material products prepared as described herein will typically resist phase separation, are storage stable, provide superior low temperature properties and have excellent high temperature stiffness. When the ground material is mixed at a ratio of from 10–15% with asphalt such as WY Sour AC-20, AC-10, Venezu, AC-20, Saudi AC-20 and the like, by any known method, the storage stability of the asphalt product per ASTM D5892 (incorporated herein by reference) also known as ht "Cigar Tube" storage stability test will typically range for the top (SP, top, ° F.) from 133–144 and at the bottom (SP, bottom, ° F.) from 134–156. The change in storage stability between the top and bottom sections generally remains substantially unchanged, that is, the $\Delta F°$ from top to bottom will preferably be from 0–2 degrees. this is beneficial, inter alia, because the small change in storage stability of the asphalt will minimize cracking due to temperature changes since the layers of asphalt applied for example on a road, will generally age at the same rate. Asphalt including a ground material with one or more of the instantly described additives will also be easier to store and ship.

The additive can be added in any desired amount. Preferably the additive is added in an amount from 0.05% to 95%, more preferably form 5% to 40% advantageously from 5% to 20% but in a preferred embodiment is added in an amount of about 10% or 10%, in each case being based on the total weight of the material.

It is important to note that the use of the term "production of material particles" is not meant as a term of limitation, insofar as any product which may incorporate the material product is intended to be within the scope of the term. For example, the materialic product may be incorporated into or useful in the production of air blown asphalt, paving membranes, etc.(, paving cement (i.e., portland cement), the manufacture of any rubber article (e.g., tires, carpet backings, shoe soles, plastic garbage containers, etc.), thermoplastic materials, automotive goods (i.e. underbody coatings), insulation, etc.

EXAMPLE 1

A sample of ground tire rubber is prepared by in accordance with the two-stage grinding method to approximately 80 mesh (180 microns) as described in U.S. Pat. No. 5,411,215 and incorporated herein by reference. The ground tire rubber is then placed in a supercritical-capable vessel in a continuous mode. The supercritical carbon dioxide is at a pressure of 700 psi and a temperature of 54–58 degrees Fahrenheit. The supercritical carbon dioxide is given adequate time to swell the rubber. The pressure of the supercritical-capable vessel is then rapidly dropped, causing the rubber particles to explode into finer particles. The resulting fine particles are in the micron size and below.

EXAMPLE 2

The method of Example 1 is followed, except the tire rubber that used been shredded by a tire shredder and the impurities of the tire, such as nylon and steel fiber, have not yet been removed, and the tire rubber is introduced into the super-critical vessel in a continuous mode. The tire rubber is also coarser than that of Example 1, at about 10 mesh (2 mm). The rubber of the tire chips becomes swollen with the supercritical carbon dioxide causing a delamination of the rubber and materials such as steel and nylon to separate from the rubber. The separated materials are then mechanically separated while the carbon dioxide is still under supercritical conditions. The resulting fine particles are in the micron size and below. The particles are then separated from the impurities such as nylon and steel fiber.

EXAMPLE 3

A sample of ground tire rubber is prepared by in accordance with the two-stage grinding method to approximately 80 mesh as described in U.S. Pat. No. 5,411,215 and incorporated herein by reference, with the exception that during the first grinding operation, one or more additives are added in the weight percentages indicated in Table 1 below. The ground tire rubber is then placed in a supercritical-capable vessel in a continuous mode. The pressure of the supercritical vessel is then rapidly dropped, causing the rubber particles to explode into finer particles. The resulting fine particles are under 40 mesh.

EXAMPLE 4

The method of example 3 is followed, except the tire rubber that used been shredded by a tire shredder and the impurities of the tire, such as nylon and steel fiber, have not yet been removed. The rubber of the tire chips becomes swollen with the supercritical carbon dioxide causing a delamination of the rubber and materials such as steel and nylon to separate from the rubber. The separated materials are then mechanically separated while the carbon dioxide is still under supercritical conditions. One or more additives are added in the weight percentages indicated in Table 1 below.

The method claimed below will also function on grinding machines which have counter rotating rotor stones, as are commonly used in the pulp and paper grinding industry. The method claimed below is not restricted to the particular embodiments described above. The method claimed below will function on any grinding machine, including grinding machines having counter-rotating rotors (as are commonly found in the pulp and paper grinding industry).

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, or use of materials) without materially departing from the novel teachings and advantages of the invention as defined in the appended claims. Other substitutions, modifications, changes and omissions may be made in the design, operating conditions and arrangement of the preferred embodiments without departing from the scope of the invention as expressed in the appended claims.

Additional advantages, features and modifications will readily occur to those skilled in the art. Therefore, the invention in its broader aspects is not limited to the specific details, and representative devices, shown and described herein. Accordingly, various modifications maybe made without departing from the scope of the general inventive concept as defined by the appended claims and their equivalents.

TABLE 1

|  | Control | 1 | 2 | 3 | 4 | 5 | 6 | 7 | 8 | 9 | 10 |
|---|---|---|---|---|---|---|---|---|---|---|---|
| Asphalt % | | | | | | | | | | | |
| Cligo Venezuelan AC-5 | 90 | 90 | 90 | 90 | 90 | 90 | | | | | |
| Diamond Shamrock AC-20 | | | | | | | 75 | 75 | 75 | 75 | 75 |
| Polymer-Type % | | | | | | | | | | | |
| Ground Tire Rubber 100% | 10 | | | | | | | | | | |
| Ground Tire Rubber + 10% or Aromatic Oil | | 10 | | | | | 25 | | | | |
| Ground Tire Rubber + 10% KRATON | | | 10 | | | | | 25 | | | |
| Ground Tire Rubber + EVA | | | | | 10 | | | | 25 | | |
| Ground Natural Rubber | | | | | 10 | | | | | 25 | |
| Dupont EVALOY + 10% Ground Tire Rubber | | | | | | 10 | | | | | 25 |
| Softening Point, ° F. | 142 | 117 | 114 | 122 | 116 | 129 | 129 | 125 | 137 | 132 | 148 |
| Penetration | | | | | | | | | | | |
| Pen at 4° C. | 105 | 50 | 48 | 54 | 56 | 47 | 36 | 38 | 31 | 41 | 30 |
| 25° C. | 113 | 103 | 107 | 107 | | | 83 | 100 | 66 | | |
| Force Ductility, max-force kg at 10° C., kg/cm$^3$, force at 24 cm (1 cm/min) % recovery 800% elongation Storage Stability, 5 days, 205° C. | 0.23 | 0.14 | 0.14 | 0.12 | 0.29 | 0.341 | 0.34 | 0.42 | 0.73 | 0.96 | 1.22 |
| Softening Point - top | 174 | 112 | 122 | 111 | 120 | 122 | 127 | 128 | 131 | 121 | 307 |
| Softening Point - bottom | 164 | 115 | 127 | 125 | 119 | 143 | 131 | 141 | 158 | 127 | 152 |
| Difference | 10 | 3 | 5 | 14 | 1 | 21 | 4 | 13 | 27 | 6 | 155 |

TABLE 1-continued

|  | Control | 1 | 2 | 3 | 4 | 5 | 6 | 7 | 8 | 9 | 10 |
|---|---|---|---|---|---|---|---|---|---|---|---|
| Viscosity, cps |  |  |  |  |  |  |  |  |  |  |  |
| 175° C. | 687 | 249 | 243 | 162 |  |  | 2477 | 2047 | 2643 |  |  |
| 190° C. | 470 | 162 | 158 | 77 | 108 | 244 | 1452 | 1597 | 1568 | 1443 | 7017 |
| 205° C. | 350 | 115 | 111 | 56 |  |  | 1107 | 1172 | 1040 |  |  |
| Cold temperature mandrel bend | −35 | −10 | −10 | −10 | −10 | −10 | −10 | −10 | −10 | −15 | −15 |
| Load Strain properties at 10° C., in/lbs | 4.13 | 5.52 | 5.3 | 5.7 | 5.4 | 7.9 | 10.8 | 10.6 | 14.2 | 22.01 | 23.3 |
| tensile strength, max lbs. | 0.6 | 0.2 | 0.3 | 0.3 | 0.5 | 0.7 | 0.8 | 0.9 | 1.6 | 1.98 | 2.8 |
| % elongation at break | 23.5 | 69 | 69 | 69 | 69 | 69 | 69 | 69 | 58 | 60 | 52.2 |
| % recovery at break | 784 | 2300 | 2300 | 2300 | 2300 | 2300 | 2300 | 2300 | 1933 | 2000 | 2000 |
| PAV aged 9100° C., 300 psi, 20 hrs) |  |  |  |  |  |  |  |  |  |  |  |
| PAV Softening Point, ° F. | 156 | 133 | 140 | 134 | 143 | 167 | 143 | 144 | 148 | 133 | 166 |
| Penetration |  |  |  |  |  |  |  |  |  |  |  |
| PAV Pen at 4° C. | 108 | 36 | 39 | 32 | 38 | 31 | 28 | 29 | 28 | 33 | 28 |
| Pen ratio, aged/unaged | 1.03 | 0.72 | 0.81 | 1 | 0.68 | 0.65 | 1 | 1 | 0.93 | 0.69 | 0.93 |
| Force Ductility max-force kg | 0.82 | 0.41 | 0.44 | 0.77 | 0.88 | 1.64 | 14 | 1 | 1.21 | 1.28 | 1.7 |
| kg/cm$^3$, force at 24 cm (1 cm/min) |  | 0.22 | 0.31 | 0.47 | 0.12 | 1.17 | 0.35 | 0.45 | 0.5 | 0.25 | 1.29 |
| % recovery 800% elongation | 48 | 64 | 68 | 64 | 42 | 65 | 58 | 63 | 62 | 46.7 | 67.9 |
| Cold temperature mandrel bend, ° C. | −25 | −5 | −5 | −5 |  | −5 | −10 | −10 | −10 | −10 | −10 |
| Load strain properties at 10° C., in/lbs | 4.42 | 19.06 | 27.86 | 24.5 |  |  | 23.9 | 28.8 | 34.1 |  |  |
| tensile strength, max lbs. | 1.6 | 1.4 | 1.6 | 2.05 |  |  | 2.8 | 2.8 | 4.35 |  |  |
| elongation, cm | 9 | 62.5 | 61 | 52 |  |  | 42 | 45 | 37.3 |  |  |
| % at break | 300 | 2084 | 2033 | 1734 |  |  | 1400 | 1492 | 1242 |  |  |

What is claimed is:

1. A method for reducing a particle size of a material comprising rubber, the method comprising:

optionally reducing the particle size of said material comprising rubber;

swelling said material comprising rubber with a super critical liquid under pressure; and reducing said pressure to cause vaporization of said super critical liquid from said material.

2. The method according to claim 1, wherein said super critical liquid is carbon dioxide or nitrogen.

3. The method according to claim 1, wherein said super critical liquid has a solubility parameter within 1.0 of said material.

4. The method according to claim 1, wherein said super critical liquid has a solubility parameter within 1.0 of a monomer of said material.

5. The method according to claim 1, further comprising adding an additive before allowing said material to swell.

6. The method according to claim 5, wherein said additive is water.

7. The method according a claim 5 wherein said additive is a surfactant.

8. The method according to claim 1, further comprising adding a first and a second additive to said material either before or during said swelling with said a super critical liquid.

9. The method according to claim 8 wherein the first additive is selected from the group consisting of resin acids, oleic acid, oligimers thereof, esters thereof, and mixtures thereof.

10. The method according to claim 8 wherein the first additive is selected from the group consisting of tetrahydronfuran, dimethyl formamide, fatty amines, and mixtures thereof.

11. The method according to claim 8 wherein the first additive and the second additive are selected from the group consisting of water miscible dispersing agents, surfactants, and mixtures thereof.

12. The method according to claim 8 wherein the first additive and the second additive are selected from the group consisting of resins, rosins, resin acids, and mixtures thereof.

13. The method of claim 8 wherein the first additive and the second additive are selected from the group consisting of rosin acid, polymerized rosin acid, esters of rosin acid, dispersions of rosin acid, dispersions of esters of rosin acid, copolymers of rosin acid, disproportionated rosin acid, hydrogenated rosin acid, 9-anthracene carboxylic acid, 2-ethylhexanie acid, acetal R-type acids, and mixtures thereof.

14. A ground particle made from the process of claim 1 comprising:

a material comprising rubber, and an additive, wherein the particle is less than 40 mesh.

15. The method of claim 8 wherein the second additive is an organic acid.

16. The ground particle of claim 15 wherein the additive is selected from the group consisting of tall oil, resin acids, oleic acid, oligimers thereof, esters thereof, and mixtures thereof.

17. An asphalt comprising a particle as claimed in claim 16.

* * * * *